Figure 1:
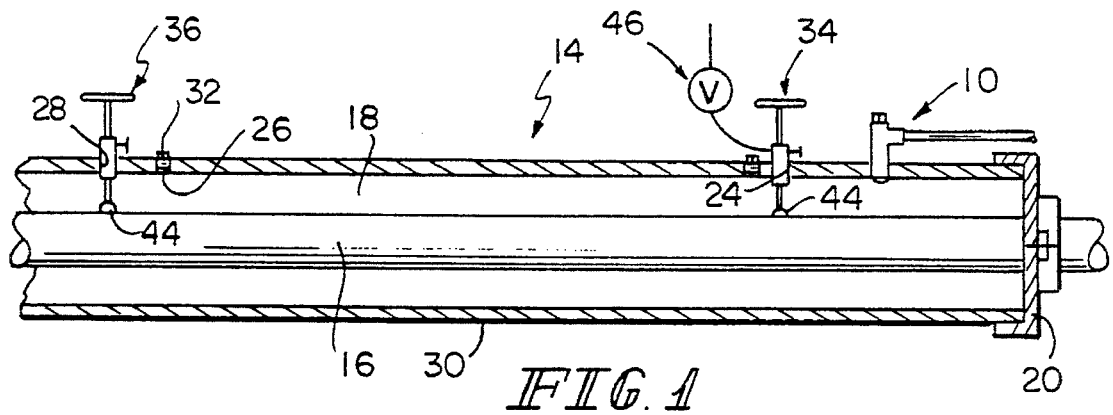
Figure 2:
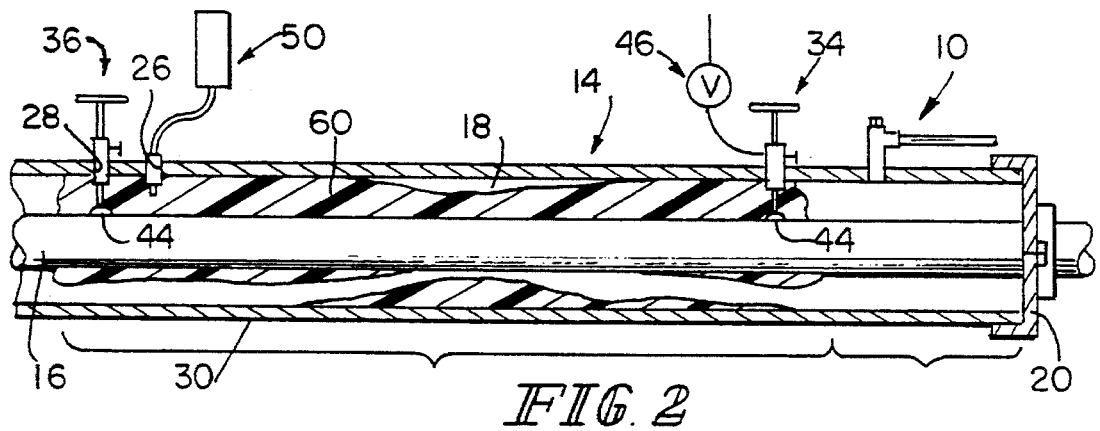
Figure 3:
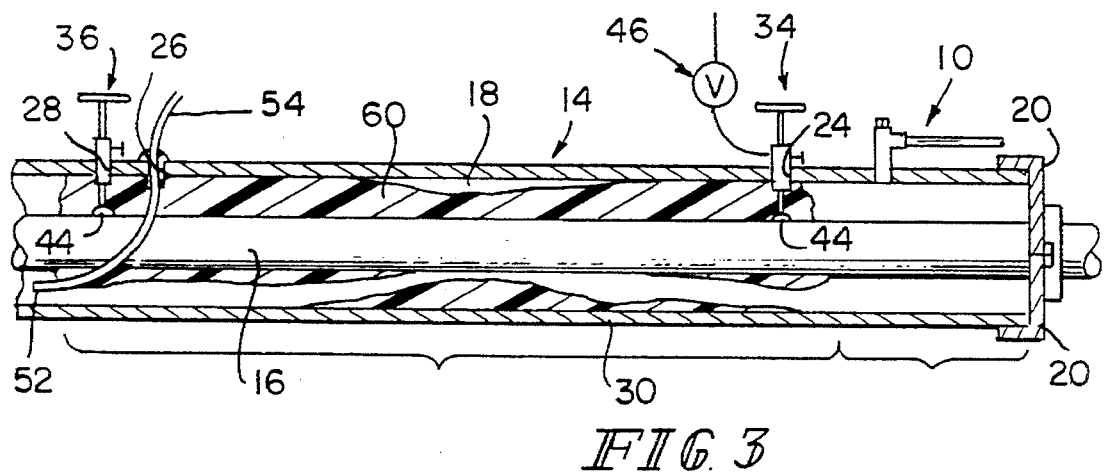
Figure 4:
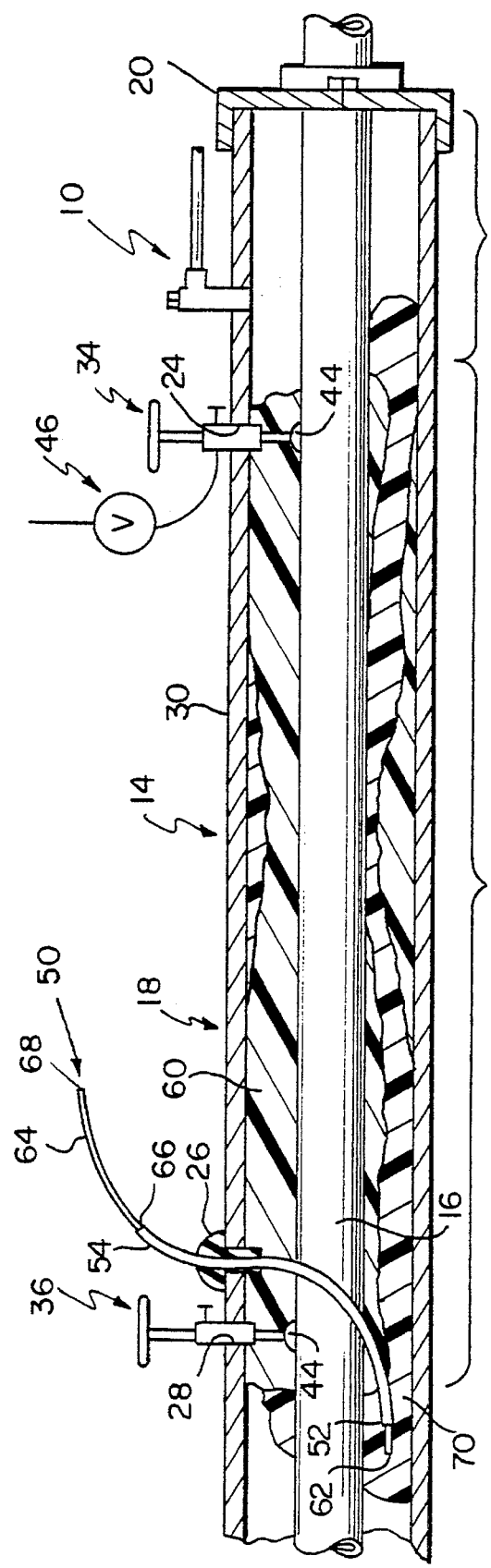

United States Patent [19]

Martin et al.

[11] Patent Number: 5,467,795
[45] Date of Patent: Nov. 21, 1995

[54] METHODS OF SEALING ANNULAR SPACE BETWEEN INNER AND OUTER GAS MAINS FOR TIE-OVERS

[75] Inventors: Luther W. Martin, Champaign; Richard L. Smith, Edwardsville, both of Ill.

[73] Assignee: Insertec Systems, Inc., Champaign, Ill.

[21] Appl. No.: 193,570

[22] Filed: Feb. 8, 1994

[51] Int. Cl.$^6$ .......................... F16L 55/162; F16L 55/165
[52] U.S. Cl. .................................. 137/15; 138/97
[58] Field of Search .................. 137/1, 15, 315; 138/97; 29/402.01, 402.03, 402.04, 402.08, 890.14

[56] References Cited

U.S. PATENT DOCUMENTS

| | | | |
|---|---|---|---|
| 3,688,801 | 9/1972 | Rohrer | 138/97 |
| 3,845,789 | 11/1974 | Rohrer | 138/97 |
| 4,009,732 | 3/1977 | Martin et al. | 138/97 |
| 4,090,534 | 5/1978 | Martin et al. | 138/97 |
| 4,252,152 | 2/1981 | Martin et al. | 138/97 |
| 5,062,207 | 11/1991 | Martin et al. | 138/97 |

*Primary Examiner*—George L. Walton
*Attorney, Agent, or Firm*—Barnes & Thornburg

[57] ABSTRACT

A method of tying over an individual customer service connection from a live outer gas main to an inner gas main inserted within the liver outer gas main comprises defining a generally annular region within the space between the inner and outer mains. The region is upstream from the customer service connection between the customer service connection and the source of gas for the outer main. The sidewall of the outer main is opened intermediate the ends of the region, and an amount of a high-density liquid foaming composition sufficient to fill the region is introduced into the opening. The foaming composition is permitted to foam and harden to a plug in the region. Before the foaming composition is permitted to foam and harden, a first end of a first conduit is inserted into the opening, and pushed into the space so that the first end lies upstream from the region. A section of outer main downstream from the region is then removed and the new customer service connection is placed through the sidewall of the inner main exposed by cutting away the outer main.

5 Claims, 2 Drawing Sheets

METHODS OF SEALING ANNULAR SPACE BETWEEN INNER AND OUTER GAS MAINS FOR TIE-OVERS

This invention relates to techniques for inserting smaller diameter gas main into larger diameter gas main and for tying over the services of individual gas customers from the larger diameter gas main with minimal disruption of customer service during the tie-over operation.

Techniques for conducting such insertions and tie-overs are known. There are, for example, the techniques illustrated and described in U.S. Pat. Nos. 5,062,207; 4,252,152; 4,090,534; 4,009,732; 3,845,789; and, 3,688,801. The technique of the present invention constitutes an improvement over the technique illustrated and described in, for example, U.S. Pat. No. 4,009,732. The technique of the present invention recognizes that the high density liquid foaming materials employed in many of the above-noted prior art techniques are multiple component materials, typically including, for example, a resin and a catalyst. The integrity of the obstruction formed in the space between the outer main and the inner main depends to a substantial extent on thorough mixing of the correct proportions of the foam's components. Tests on the obstructions have established that occasionally some gas leaks past the obstruction. Since the downstream end of the outer main is to be removed in a later step of the tie-over process, it is advantageous to discover any leakage past the obstruction and repair it as soon as it is discovered. This repair can be done, for example, by re-conducting the obstruction-building process upstream from the leaking obstruction. However, that process becomes somewhat cumbersome if it has to be conducted a second time.

According to the invention, an improvement to the process of, for example, U.S. Pat. No. 4,009,732 is provided. An individual customer service connection is tied over from a live outer gas main to an inner gas main inserted within the live outer gas main by the steps of defining upstream from the customer service connection between the customer service connection and the source of gas for the outer main, a generally annular region within the space between the inner and outer mains, opening a sidewall of the outer main intermediate the ends of the region, introducing into said opening an amount of a high-density liquid foaming composition sufficient to fill the region, permitting the foaming composition to foam and harden to a plug in the region, removing a section of outer main downstream from the region, and placing the new customer service connection through the sidewall of the inner main exposed by cutting away the outer main. The improvement comprises, before permitting the foaming composition to foam and harden, inserting into the opening a first end of a first conduit having said first end and a second end, and pushing the first conduit into the space so that its first end lies upstream of the region.

Illustratively, the invention further includes the step of, after permitting the foaming composition to foam and harden, testing to determine the integrity of the hardened foam at preventing gas from flowing downstream below the region.

Additionally, illustratively, the invention includes the steps of inserting into the second end of the first conduit a first end of a second conduit having said first end and a second end, pushing the second conduit into the first conduit so that the first end of the second conduit lies upstream of the first end of the first conduit, and introducing into the second first end of the second conduit an amount of a high-density liquid foaming composition sufficient to fill a portion of the space adjacent and upstream from the region.

Further, illustratively, the method comprises permitting gas to flow from the second end of the first conduit to cause the high density liquid foaming composition introduced into the second end of the second conduit to foam and harden immediately adjacent the hardened foam in the region.

Additionally, illustratively, the step of inserting into the opening a first end of a first conduit having said first end and a second end before permitting the foaming composition to foam and harden comprises the step of inserting into the opening a first end of a first conduit before introducing into the opening an amount of the foaming composition sufficient to fill the region.

The invention may best be understood by referring to the following description and accompanying drawings. In the drawings:

FIGS. 1–4 illustrate fragmentary longitudinal sectional side elevational views through an outer gas main during various phases of a tie-over of a customer gas connection from the outer main to an inner main previously inserted into the outer main.

Referring to FIG. 1, a customer service tee 10 is illustrated connected to a live outer gas main 14. An inner main 16 has previously been inserted into outer main 14 by any of a number of known techniques. A generally annular space 18 has been defined by this insertion. Gas continues to be supplied through space 18 to customers whose service tees, for example, service tee 10 in FIG. 1, are still connected to outer main 14. Customers whose service has already been tied over, for example, those downstream to the right of the section illustrated in FIG. 1, receive their gas through inner main 16.

Outer main 14 is terminated by an end cap 20. It is advantageous to begin tying over customers on any given section of main from that location on the main furthest from the gas source. Therefore, beginning adjacent the customer service tee 10 closest to end cap 20 (furthest from the gas source), holes 24, 26, 28 are drilled and tapped through the wall 30 of the outer main 14. Hole 26 is temporarily closed by a screw-in plug 32. Centering tools 34, 36 are installed in holes 24, 28, respectively. Each of centering tools 34, 36 includes an attachment mechanism 44 which illustratively is a suction cup attached to a plunger in the centering tool 34, 36. Typically, a fast-drying adhesive is applied to the suction cups before they are brought into contact with the inner main 16 so that the cups 44 become more or less permanently attached to the inner main 16. Once this attachment is achieved, the centering tools 34, 36 are used to center the inner main substantially within the outer main 14. A valve 46 provided in centering tool 34 permits the selective removal of gas from the downstream end of outer main 14 upstream from, and adjacent, customer service tee 10. The service tee is then closed, halting gas flow in the downstream end of the outer main 14.

Plug 32 is then removed and a foaming composition, typically a two-component foaming composition 50 is introduced through hole 26. Contemporaneously with the introduction of the foaming composition 50 into hole 26 or shortly thereafter, a first end 52 of a length 54 of relatively rigid but somewhat flexible resin conduit is introduced into hole 26. Conduit 54 is fed through hole 26 in the upstream direction, away from end cap 20. If this is done after the introduction of foaming composition 50, it must be accomplished before the complete reaction of the composition 50 which results in the hardened foam plug 60 which forms in the annular space 18. Care must be taken to prevent the foaming composition 50 from entering and plugging end 52 of conduit 54, but this can be achieved by applying, for example, a thin paper tape or the like over end 52. Care must also be taken that before composition 50 forms the plug 60, end 52 lies upstream from the upstream extent of plug 60. Valve 46 is opened, permitting some gas to escape from annular space 18 and permitting the foaming composition 50 to migrate downstream to the desired downstream extent of plug 60. Valve 46 is then closed.

After plug 60 is given time to form, the integrity of plug 60 is tested. This can be done in several ways, the most straightforward of which is by opening the customer service tee and determining whether any gas is flowing past the plug 60. If no gas is flowing past plug 60, tying of the customer service over to the inner main 16 proceeds as described in the prior art. However, if for any reason, such as the inaccurate proportioning or incomplete mixing of foaming composition 50 components, there is an unacceptable leakage of gas past plug 60, a first end 62 of a second conduit 64 is introduced into a second end 66 of conduit 54. Conduit 64 is fed into conduit 54 until the first end 62 of conduit 64 lies upstream in outer main 14 from the first end 52 of conduit 54. Foaming composition 50 is then introduced into a second end 68 of conduit 64 and into annular space 18 upstream from the first end 52 of first conduit 54. End 66 of conduit 54 is connected to permit gas to flow out through first conduit 54. This, in turn, permits the downstream end of a repair plug 70 which forms from the foaming composition 50 supplied through conduit 64 to migrate downstream in main 14 until plug 70 lies immediately adjacent the leaking plug 60. This technique overcomes the need to drill additional centering and foam supply holes in outer main 14 upstream from plug 60 if plug 60 should be found to be leaking when it is tested.

Tying over of the customer service 10 from outer main 14 to inner main 16 then proceeds as described in the prior art.

What is claimed is:

1. In a method of tying over an individual customer service connection from a live outer gas main to an inner gas main inserted within the live outer gas main comprising the steps of defining a generally annular region within the space between the inner and outer mains, said region being upstream from the customer service connection between the customer service connection and the source of gas for the outer main, opening a sidewall of the outer main intermediate the ends of said region, introducing into said opening an amount of a high-density liquid foaming composition sufficient to fill said region, permitting the foaming composition to foam and harden to a plug in said region, removing a section of outer main downstream from said region, and placing the new customer service connection through the sidewall of the inner main exposed by cutting away the outer main, the improvement comprising, before permitting the foaming composition to foam and harden, inserting into said opening a first end of a first conduit having said first end and a second end, and pushing said first conduit into the space so that said first end lies upstream of the region so that said first end of said first conduit will not be obstructed by said hardening of said foaming composition.

2. The method of claim 1 and further comprising, after permitting the foaming composition to foam and harden, testing to determine the integrity of the hardened foam at preventing gas from flowing downstream below the region.

3. The method of claim 2 further comprising inserting into the second end of the first conduit a first end of a second conduit having said first end and a second end, pushing said second conduit into the first conduit so that said first end of the second conduit lies upstream of the first end of the first conduit, and introducing into said second end of said second conduit an amount of a high-density liquid foaming composition sufficient to fill a portion of the space adjacent and upstream from said region.

4. The method of claim 3 further comprising permitting gas to flow from the second end of the first conduit to cause the high density liquid foaming composition introduced into said second end of said second conduit to foam and harden immediately adjacent the hardened foam in said region.

5. The method of claim 1, 2, 3, or 4 wherein the step of inserting into said opening a first end of a first conduit having said first end and a second end before permitting the foaming composition to foam and harden comprises the step of inserting into said opening a first end of a first conduit before introducing into said opening an amount of said foaming composition sufficient to fill said region.

* * * * *